United States Patent [19]

Rowland

[11] Patent Number: 4,555,161
[45] Date of Patent: Nov. 26, 1985

[54] ENCAPSULATED RETROREFLECTIVE MATERIAL AND METHOD OF MAKING SAME

[75] Inventor: William P. Rowland, Southington, Conn.

[73] Assignee: Reflexite Corporation, New Britain, Conn.

[21] Appl. No.: 580,736

[22] Filed: Feb. 16, 1984

[51] Int. Cl.$^4$ .............................................. G02B 5/124
[52] U.S. Cl. .................................. 350/103; 350/590; 40/615
[58] Field of Search ................. 350/97, 102, 103, 590; 40/582, 583, 615, 616, 913; 156/308.4

[56] References Cited

U.S. PATENT DOCUMENTS

| | | | |
|---|---|---|---|
| 2,948,191 | 8/1960 | Hodges, Jr. et al. | 40/615 |
| 3,017,713 | 1/1962 | Butler | 40/615 |
| 3,067,536 | 12/1962 | Brittsan | 40/615 |
| 3,190,178 | 6/1965 | McKenzie | 40/616 |
| 3,924,929 | 12/1975 | Holmen et al. | 350/103 |
| 3,934,065 | 1/1976 | Tung | 40/615 |
| 4,025,159 | 5/1977 | McGrath | 350/105 |
| 4,075,049 | 2/1978 | Wood | 40/616 |
| 4,082,426 | 4/1978 | Brown | 40/615 |
| 4,231,830 | 11/1980 | Ryan et al. | 40/615 |
| 4,235,512 | 11/1980 | Brasfield et al. | 350/105 |

FOREIGN PATENT DOCUMENTS 1476447  6/1977  United Kingdom ............... 350/103

Primary Examiner—John K. Corbin
Assistant Examiner—William Propp

[57] ABSTRACT

A retroreflective laminar sheet assembly comprises base and cover sheets made from flexible synthetic plastic materials, and an array of interposed retroreflective film pieces seated within discrete cells formed therebetween. The sheets and film pieces of different compositions are used to afford a preselected balance of mechanical and optical properties, and the construction is such that distortion is minimized and flexibility of the assembly is maintained. The invention also provides novel methods by which such an assembly can be produced, which may take advantage of inherent or induced cohesive characteristics of the components employed.

10 Claims, 4 Drawing Figures

ENCAPSULATED RETROREFLECTIVE MATERIAL AND METHOD OF MAKING SAME

BACKGROUND OF THE INVENTION

Light reflective materials are now commonly applied to a wide range articles and structures for safety and decorative purposes. The so-called "retroreflective materials" are capable of reflecting the bulk of the light rays impinging upon them in a substantially parallel path back toward the source, and are therefore highly effective, particularly to enhance night-time visibility.

A retroreflective material comprised of minute glass spheres embedded in a matrix of synthetic resin has long been commercially available from the 3M Company, of St. Paul, Minn., under the trade designation SCOTCH-LITE. Another type of retroreflective element material, commercially available from the Reflexite Corporation of New Britain, Conn., under the trademark RE-FLEXITE, comprises a molded plastic member having "cube corner" formations thereon, such as disclosed in Rowland U.S. Pat. Nos. 3,684,348; 3,689,346; 3,810,804; 3,811,983; 3,830,682; 3,935,359; 3,975,083; 3,992,080; 4,244,683; and 4,332,847. Also indicative of efforts to use cube corner formations for retroreflective structures are Straubel U. S. Pat. No. 835,648; Hedgewick et al U.S. Pat. No. 3,258,840; and Jungersen U.S. Pat. Nos. 2,310,790 and 2,444,533.

Among the numerous practical applications for such retroreflective materials are included tapes and patches, bands for posts and barrels, traffic cone collars, and the like. Most applications require that the retroreflective structure exhibit a substantial degree of flexibiity, and in many instances it must be capable of withstanding conditions of thermal cycling and physical abuse without undue distortion or damage and over extended periods of time. Although numerous synthetic plastics are known which are entirely suitable for use under such conditions, and which also afford completely adequate levels of flexibility, in many instances they do not exhibit properties that are consistent with optimal retroreflection. On the other hand, a variety of plastics can readily be molded so as to produce precise cube corner formations, and thereby provide structures that are capable of reflecting light with high efficiency; however, such plastics often lack physical characteristics necessary for certain practical applications.

Exemplary of prior art attempts to provide composite retroreflective materials are the following U.S. Pat. Nos.: Hodgson Jr. et al 2,948,191; Butler 3,017,713; Tung 3,934,065; McGrath No. 4,025,159; Brown 4,082,426; Brasfield et al 4,235,512; and White 4,349,598. The Tung patent specifically shows the utilization of retroreflective sheet material formed into a conical sleeve for mounting upon a traffic cone; a cellular retroreflective structure is disclosed in the McGrath patent; and White teaches using cube corner retroreflectors in a composite film structure. Despite the foregoing, a need remains for a retroreflective material in which is combined desirable mechanical properties, such as toughness, stiffness, and flexibility, together with desirable retroreflective properties, such as brightness and control of incidence and observation angles.

Thus, it is an object of the present invention to provide a novel retroreflective laminar sheet material wherein desired mechanical and retroreflective properties are combined in a highly effective and yet uncomplicated structure.

It is also an object of the invention to provide such a material comprised of plastic sheet components selected for their mechanical properties, combined with separately formed retroreflective components selected to afford desirable optical and photometric properties.

A more specific object of the invention is to provide a novel laminar sheet assembly wherein a multiplicity of retroreflective film pieces are disposed between sheets of flexible plastic material in such a manner that the film pieces are protectively disposed within air and water-tight cells, with the resultant assembly exhibiting a desirable level of mechanical flexibility and freedom from distortion.

Yet another object of the invention is to provide a novel retroreflective sheet assembly in which a high degree of flexibility is possible in the choice of component materials, thereby readily permitting the sheeting to be tailored to a wide range of applications.

Additional objects of the invention are to provide novel methods for the production of retroreflective sheet assemblies having the foregoing features and advantages, which methods are relatively uncomplicated and yet highly efficient.

SUMMARY OF THE INVENTION

It has now been found that certain of the foregoing and related objects of the invention are readily attained in a retroreflective laminar sheet assembly comprising a length of flexible synthetic plastic sheet material providing a base sheet, a substantially coextensive length of flexible transparent synthetic plastic sheet material providing a cover sheet, and a multiplicity of retroreflective film pieces disposed between the base and cover sheets along the length thereof. The film pieces are arranged as an array in a predetermined pattern for retroreflectance through the cover sheet, and the sheets are bonded to one another in the areas between and about the film pieces to provide a multiplicity of discrete cells in which the film pieces are seated.

In the preferred embodiments of the assembly the film pieces are fabricated from a synthetic plastic sheet material which is of a composition different from that of which the base and cover sheets are fabricated. Generally, the peripheral edge portions of the film pieces will be spaced slightly inwardly from the bonded areas defining the cells in which they are seated, so as to permit nondistorting differential thermal expansion to occur therebetween. Most desirably, a portion of each of the film pieces will define a multiplicity of minute cube corner formations, providing the retroreflective properties thereto.

Other objects of the invention are attained by the provision of a method for the production of such a sheet assembly, wherein a multiplicity of retroreflective film pieces are desposited upon a first sheet of flexible synthetic plastic material, as an array of predetermined pattern in which the film pieces are spaced from one another. A second sheet of flexible synthetic plastic material is disposed upon the first, and the sheets are bonded to one another in the border areas between and about the film pieces, to create a multiplicity of discrete adjacent cells in which the film pieces are sealed. At least one of the sheets employed will be of a transparent material and will constitute a cover sheet through which light can be retroreflected by the underlying film pieces.

In the preferred embodiments of the method, the areas of bonding of the base and cover sheets will be spaced a distance slightly greater than the corresponding dimensions of the film pieces seated within the cells produced. Most desirably, the sheets employed will be of continuous length, and the method will be carried out continuously with the carrier sheet moving along a travel path past a supply location for the film pieces. In such a method, the film pieces may beneficially be supplied to the first sheet of flexible synthetic plastic material from a plurality of stacks disposed transversely across the travel path, comprising the supply location.

In particularly preferred embodiments of the method, the film pieces and the first sheet of plastic material will be fabricated from materials that exhibit cohesion to one another upon contact. Such a method will include a step of intermittently effecting contact between the first sheet and the outermost film piece in each of the stacks provided, to cause the sheet to effect withdrawal of the contacting film pieces from the stacks, and thereby create a multiplicity of rows of film pieces thereacross; the timing of such contacts will be such as to space the adjacent rows of film pieces from one another. Most advantageously, the confronting surfaces of the film pieces and the first sheet will be of glossy character, so as to inherently provide the desired cohesive properties.

DETAILED DESCRIPTION OF THE ILLUSTRATED EMBODIMENTS

Figure 1:
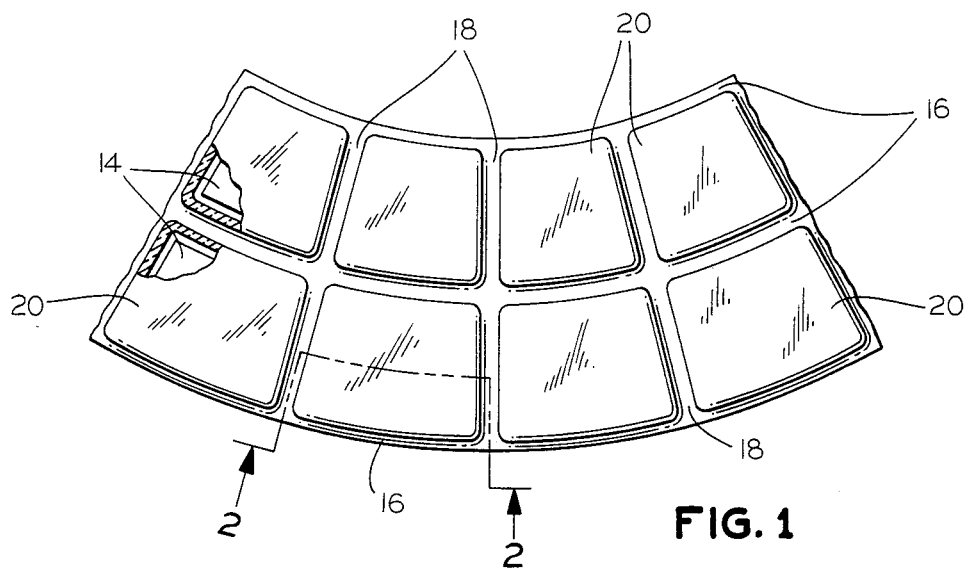
FIG. 1 is a fragmentary plan view of a laminar assembly embodying the present invention, fabricated as a generally annular section to readily permit formation into a traffic cone collar.
Figure 2:
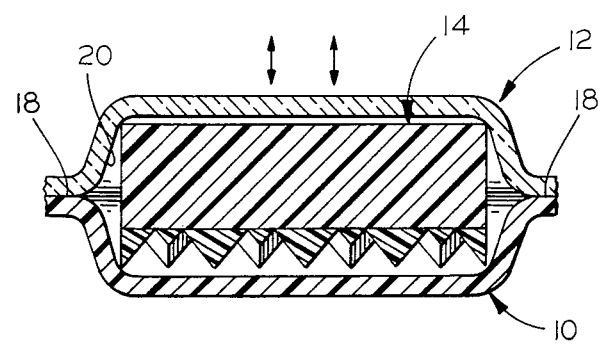
FIG. 2 is a fragmentary sectional view of the assembly of FIG. 1, taken along line 2—2 thereof and drawn to an enlarged scale, showing a retroreflective film piece disposed within a cell formed by the base and cover sheet components.

Referring initially to FIGS. 1 and 2 of the drawing, therein illustrated is a retroreflective laminar sheet assembly formed as an annular section, embodying the present invention. The assembly consists of a base sheet of synthetic plastic material, generally designated by the numeral 10, a cover sheet of transparent synthetic plastic material, generally designated by the numeral 12, and a multiplicity of retroreflective film pieces, generally designated by the numeral 14. The base sheet 10 and the cover sheet 12 are bonded to one another in areas 16, 18 which extend, respectively, generally arcuately and radially thereon, to define an array of sealed cells 20. One of the retroreflective film pieces 14 is contained within each of the cells 20, and is properly oriented to retroreflect impinging light which passes thereto through the transparent cover sheet 12.

As is indicated in FIG. 2, the bond areas 16, 18 are located so as to provide at least a small amount of spacing with respect to the corresponding film pieces 14. This construction not only provides a desirable degree of flexiblity in the composite assembly and permits the components to expand differentially with respect to one another to avoid distortion, but also ensures that bonding of the plastic sheets can be effected without interference from the seated film pieces. Excessive spacing, on the other hand, may adversely affect the retroreflective quantities of the assembly, and therefore may be undesirable; typically, a gap of about $\frac{1}{8}$ to $\frac{1}{2}$ inch between the edges of the film pieces and the bond areas will produce good results, and the gap may be of variable width along the length of bond area, such as when rectangular film pieces are contained within cells of trapezoidal configuration.

Figure 3:
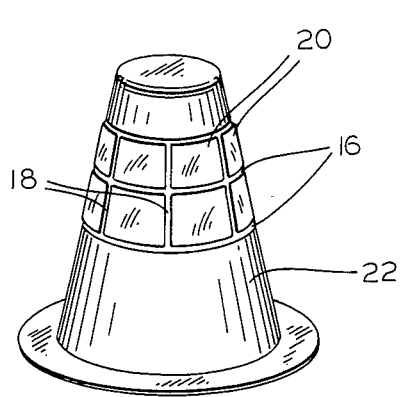
FIG. 3 is a perspective view showing the assembly of FIG. 1 formed into a collar and mounted upon a traffic cone.

As shown in FIG. 3, the sheet assembly of FIG. 1 has been formed into a tapered collar. In that configuration it can readily be disposed upon the traffic cone 22, to greatly enhance its night-time visibility and thereby increase its effectiveness for marking road hazards, and the like.

Figure 4:
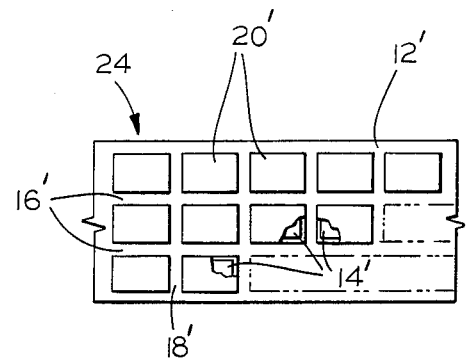
FIG. 4 is a plan view of a second laminar assembly embodying the present invention, in the form of a strip.

Turning finally to FIG. 4, the assembly 24 shown therein is essentially the same as that illustrated in the preceding Figures, with the exception that it is in strip, rather than annular, form. Thus, the assembly 24 is comprised of coextensive sheets (only the cover sheet 12' being visible), joined by a gird of longitudinally and transversely extending bond areas 16', 18', to produce cells 20' in which the film pieces 14' are seated. This Figure is provided primarily to demonstrate that the scope of the inventin encompasses a wide variety of configurations of the assembly, and is not to be construed as limited to any particular form.

It will be appreciated that, by following the teachings of the present specification, a retroreflective assembly can readily be fabricated to exhibit an optimal balance of properties, by combining components made from two or more different plastics. For example, film pieces having excellent optical and photometric properties, to retroreflect light with high intensity and at selected angular values, can be incorporated with tough elastomeric films, to afford durability and dimensional stability in the finished product.

By appropriate selection of the plastics from which the cover and base sheets are fabricated the product designer can meet a wide variety of end use requirements, such as stiffness, toughness, weatherability, chemical resistance, etc. The cover sheet can of course be made of a resin different from that used for the base sheet, and it may be modified to alter the nature of the retroreflected light. For example, the cover sheet resin can be pigmented or dyed to color the reflected light or to fluoresce impinging ultraviolet light into visible wave lengths; it can also be made as to project a pattern or message, or the like.

Although encapsulated or enclosed glass beads can be used, the retroreflective film pieces will most advantageously be of molded, minute cube corner form, such as can be be produced in accordance with the teachings of the above-cited Rowland patents. Many suitable resins for the retroreflective pieces are described, in connection with the production cube corner formations, in the paragraph beginning at line 13 of column 6 of Rowland U.S. Pat. No. 3,684,348, and exemplary resins for the base and cover films are listed in the paragraph beginning at line 46 in the same column of the patent. Although not an exhaustive listing of suitable plastics, the foregoing paragraphs of the Rowland patent are hereby incorporated into the present specification, by reference thereto, to supplement that which will be evident to those skilled in the art, in regard to resin selection.

As described above, the sheets of plastic will be bonded to one another in a grid-like pattern of narrow paths, so as to produce an array of adjoining cells, sealed against the entry of air, water, and other substances. As will be appreciated, any of several conventional techniques can be utilized to produce the necessary bonds between the two films, such as radio frequency (dielectric) welding, sonic welding, heat and pressure sealing, adhesive bonding, and the like.

The preferred method of the invention relies upon the "wetting" phenomenon by which glossy-surfaced plastic elements will adhere to one another when at least one of the two components is of an elastomeric nature. Such cohesion is normally sufficient to allow the carrier sheet (which may be either the base or the cover sheet) to be advanced to sealing means without displacement of the attached retroreflective film pieces. Electrostatic charging may, for example, also be relied upon to induce cohesion.

Placement of the retroreflective film pieces upon the sheet can best be accomplished using a bank of magazines containing stacks of the pieces disposed with a glossy surface facing the carrier sheet; generally, the magazines will simply be aligned across the path along which the carrier sheet is conveyed. The bank of magazines will of course be located ahead of the sealing means, and a suitable mechanism for intermittently bringing the sheet and outermost film pieces into contact will be associated with the magazines. Inherent or induced cohesive forces will cause the contacted film pieces to stick to the sheet, and to thereby be withdrawn from the stacks in which they are contained. The film pieces in each magazine will then be advanced sufficiently to present the following piece for withdrawal by the plastic sheet material. The second sheet will be applied to the first, and over the array of film pieces, at a downstream location, with the entire assembly then being presented to the sealing means to form the cells and thereby complete the process.

Thus, it can be seen that the present invention provides a novel retroreflective laminar sheet material wherein desired mechanical and retroreflective properties are combined in a highly effective and yet uncomplicated structure. The material may comprise plastic sheet componenets selected for their mechanical properties, combined with separately formed retroreflective components selected to afford desirable optical and photometric properties. More specifically, the invention provides a novel laminar sheet assembly wherein a multiplicity of retroreflective film pieces are disposed between sheets of flexible plastic material in such a manner that the film pieces are protectively disposed within air and water-tight cells, with the resultant assembly exhibiting a desirable level of mechanical flexibility and freedom from distortion. A high degree of flexibility in the choice of component materials is afforded, thereby readily permitting the sheeting to be tailored to a wide range of applications. The invention also provides novel methods for the production of retroreflective sheet assemblies having the foregoing features and advantages, which methods are relatively uncomplicated and yet highly efficient.

Having thus described the invention, what is claimed is:

1. A retroreflective laminar sheet assembly comprised of a first length of flexible synthetic plastic sheet material providing a base sheet, a substantially coextensive length of flexible transparent synthetic plastic sheet material providing a cover sheet, and an array of retroreflective film pieces disposed between said base sheet and cover sheet along the length thereof in a predetermined pattern for retroreflectance through said cover sheet, said base and cover sheets being bonded to one another in the areas between and about said film pieces to provide a multiplicity of discrete cells in which said film pieces are seated.

2. The assembly of claim 1 wherein said film pieces are fabricated from a synthetic plastic having a composition different from that of which said base and cover sheets are made.

3. The assembly of claim 1 wherein the peripheral edge portions of said film pieces are spaced slightly inwardly from the bonded areas defining the cells in which they are seated, to permit nondistorting differential expansion to occur therebetween.

4. The assembly of claim 1 wherein a portion of each of said film pieces provides a multiplicity of minute cube corner formations, affording retroreflective properties thereto.

5. In a method for the production of a retroreflective sheet assembly comprised of an array of retroreflective film pieces disposed between a base sheet and a cover sheet, the steps comprising: depositing upon a first sheet of flexible synthetic plastic material a multiplicity of retroreflective film pieces, said pieces being spaced from one another and arranged upon said first sheet as an array of predetermined pattern; disposing a second sheet of flexible synthetic plastic material upon said first sheet and said array of film pieces; and bonding said first and second sheets to one another in the border areas between and about said film pieces to create a multiplicity of discrete adjacent cells in which said film pieces are sealed, at least one of said sheets being transparent and constituting a cover sheet through which light can be retroreflected by said film pieces.

6. The method of claim 5 wherein said areas of bonding are spaced a distance slightly greater than the corresponding dimensions of said film pieces contained within said cells.

7. The assembly of claim 5 wherein said sheets are of continuous length, and wherein said method is carried out continuously with said first sheet moving along a travel path past a supply location for said film pieces.

8. The assembly of claim 7 wherein said film pieces are automatically supplied to said first sheet from a plurality of stacks disposed transversely across said travel path, said stacks comprising said supply location.

9. The method of claim 8 wherein said film pieces and said first sheets are mutually cohesive upon contact with one another, and wherein said method includes the step of intermittently effecting contact between said first sheet and the outermost film piece in each of said stacks to cause said sheet to withdraw said outermost pieces from said stacks and thereby create a multiplicity of rows of said film pieces across said first sheet, the timing of said contact being such as to space said film pieces in adjacent rows, one from the next.

10. The method of claim 9 wherein at least the confronting surfaces of said film pieces and said first sheet are of a glossy character, and at least one of said first sheet and said film pieces are fabricated from an elastomeric material, to inherently produce cohesion therebetween.

* * * * *